United States Patent [19]
Tobbe et al.

[11] 3,761,052
[45] Sept. 25, 1973

[54] FLOW PLUGGER VALVE

[75] Inventors: William P. Tobbe, Cleveland Heights; Ernest A. Benway, Euclid; David M. Simko, Parma Heights; Barnard J. Gallagher, Mentor; John Boylan, Cleveland Heights, all of Ohio

[73] Assignee: Whitney Research Tool Company, Emeryville, Calif.

[22] Filed: Feb. 7, 1972

[21] Appl. No.: 223,932

[52] U.S. Cl. .................................. 251/88, 251/361
[51] Int. Cl. .............................................. F16l 25/00
[58] Field of Search.................... 251/88, 214, 215, 251/216, 328, 329, 333, 361

[56] References Cited
UNITED STATES PATENTS

| | | | |
|---|---|---|---|
| 3,443,789 | 5/1969 | Glasgow et al. | 251/214 |
| 3,512,753 | 5/1970 | Weise | 251/88 X |
| 2,994,343 | 8/1961 | Banks | 251/333 X |
| 2,856,961 | 10/1958 | Kruschik | 251/361 X |
| 2,507,851 | 5/1950 | Bryant et al. | 251/361 X |
| 3,100,501 | 8/1963 | Hansen et al. | 251/361 X |
| 3,441,249 | 4/1969 | Aslan | 251/333 |

Primary Examiner—Henry T. Klinksiek
Attorney—Albert P. Sharpe, III

[57] ABSTRACT

The specification and drawings disclose a valve particularly suited for abrasive or corrosive fluids. The disclosed valve comprises a body with a generally conically shaped valve chamber and a seat insert removably positioned in the chamber. A bonnet member is removably connected to the body and has a cylindrical valve plug receiving opening axially aligned with the seat includes a first cylindrical section slidingly received in the opening an a conically shaped inner end portion adapted to enter and sealingly engage the seat insert. An actuating stem is threaded into the bonnet in axial alignment with the opening. The inner end of the stem is releasably and rotatably connected to the cylindrical end of the plug so that upon rotation of the stem, the plug can be moved toward and away from the seat. Seal ring means are carried by the cylindrical portion of the plug for sealingly engaging the walls of the opening. The seal ring means prevents fluids from passing from the valve chamber into the bonnet and seal both the stemplug connection and the stem threads from the fluid. The seal ring means comprise an assembly of three ring members including a resilient O-ring positioned between two resilient washers. The inner washer acts as a wiping ring to clean the bore of abrasive particles and prevent wear on the O-ring. The O-ring performs the primary fluid seal function and the outer washer prevents blow-out of the O-ring under operating pressure.

9 Claims, 4 Drawing Figures

FIG. I

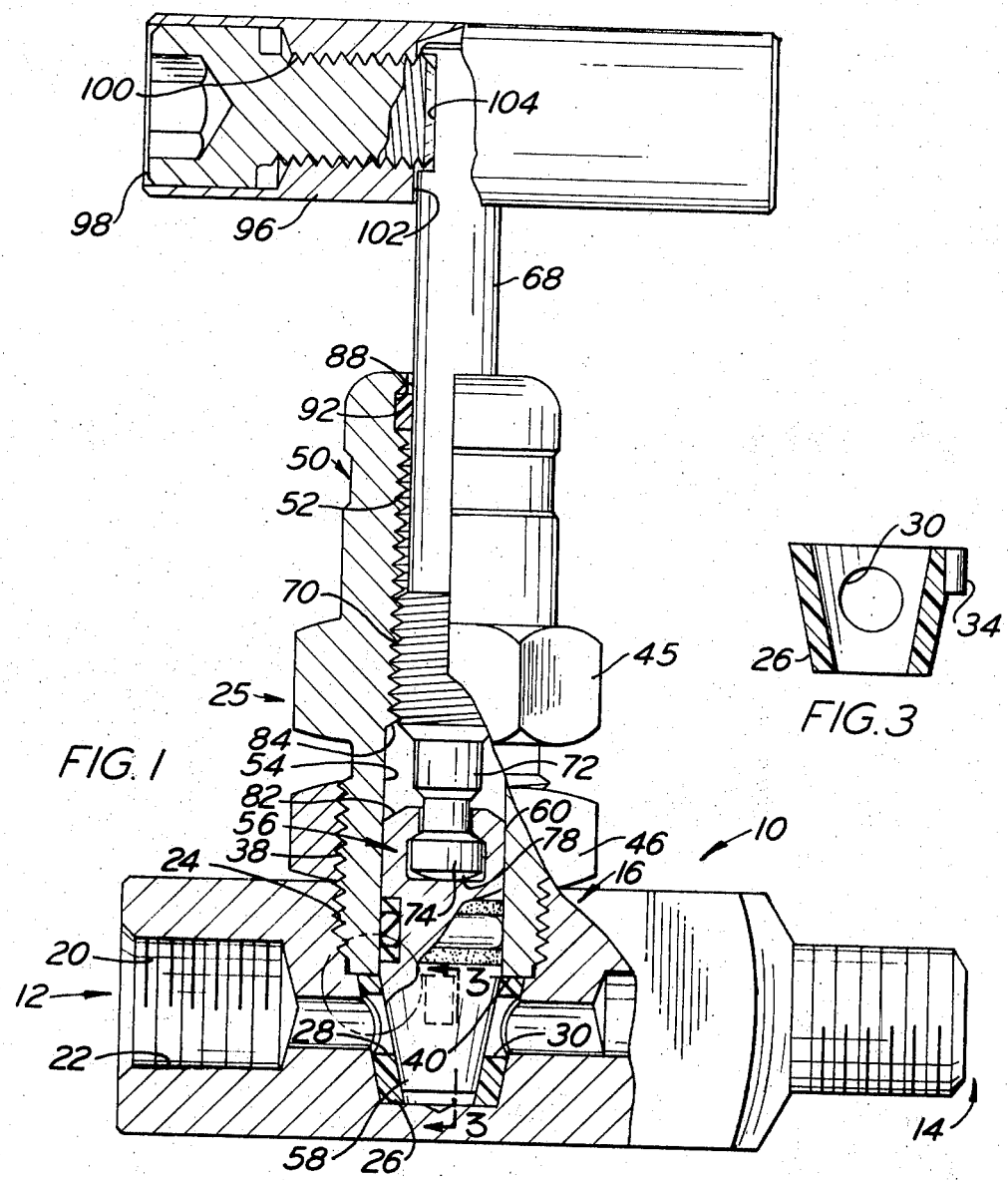
FIG. 1
FIG. 3
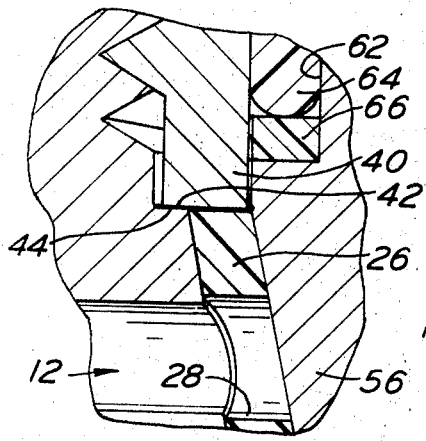
FIG. 2

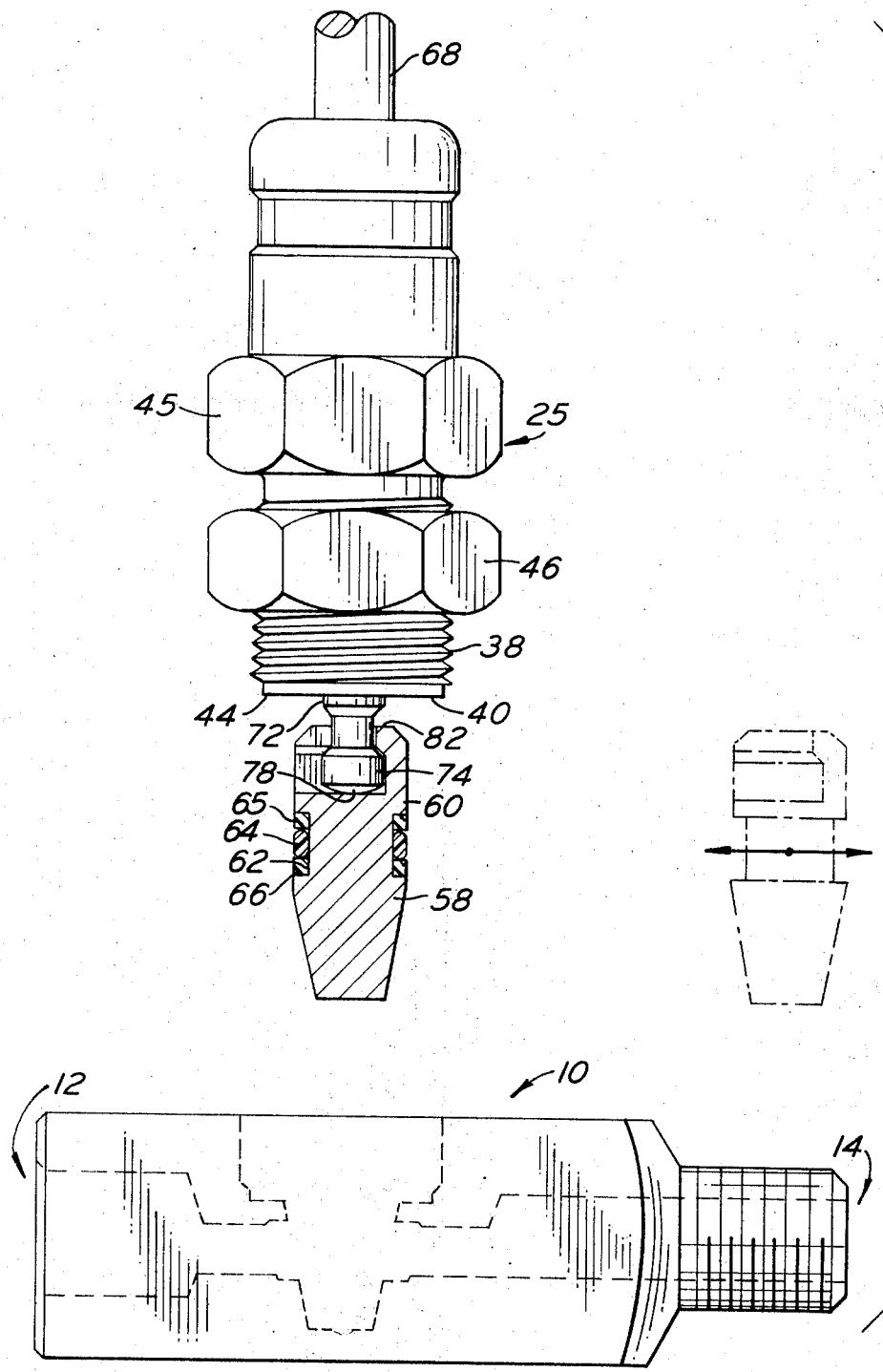

FLOW PLUGGER VALVE

The subject invention is directed toward the valve art and, more particularly, to an improved high pressure plug valve.

The invention is particularly suited for valves used under high pressure conditions and will be described with particular reference thereto; however, as will become apparent, the invention could be embodied in valves for many types of service.

Plug-type valves are widely used for controlling highly abrasive and corrosive fluids. Typically, the valves include a body having a generally conical valve chamber with a correspondingly shaped replaceable seat insert positioned therein. A conically shaped plug is mounted for reciprocation into sealing engagement with the seat insert. Typically, the seat insert is formed from a relatively soft material so that hard or abrasive particles in the fluid will be driven into the seat insert and will not score the plug upon closing. Also, the plug members are often attached to the operating stem through a rotatable connection. This permits the plug to rotate freely relative to the stem so that there is little or no relative rotation between the seat insert and plug during closing.

Even though the above mentioned features have been incorporated in the prior valves, poor functioning and failure problems have been common. For example, in the structure described, the pivotal connection between the stem and the plug is subjected to the fluid passing through the valve. This can cause abrasive particles in the fluid to enter the connection causing it to become worn and eventually lock up. Thereafter, the plug can not rotate relative to the stem. Thus, as the valve is closed, the plug rotates in the seat and abrasive particles trapped between the seat and the plug will score the plug. Similarly, the stem threads are exposed to the fluid and their lubricant can be washed away resulting in high operating torque and wear. As a consequence, the prior valves must be replaced at frequent intervals when used for fluids containing amounts of abrasive material.

The subject invention overcomes the noted problems and provides a valve of the general type described which is capable of operating for extended periods in highly corrosive or errosive fluids. Further, valves formed in accordance with the invention are simpler than prior valves to service and maintain. Also, the plugs, seal rings and seat inserts can be easily replaced as needed.

Specifically, the invention contemplates a valve of the general type described comprising a body with a generally conically shaped valve chamber and a seat insert removably positioned in the chamber. Removably connected to the body is a bonnet member having a cylindrical valve plug receiving opening axially aligned with the seat insert. A valve plug is carried in the bonnet member and includes a first cylindrical section section slidingly received in the opening and a conically shaped inner end portion adapted to enter and sealingly engage the seat insert. An actuating stem is threaded into the bonnet in axial alignment with the opening. The inner end of the stem is releasably and rotatably connected to the cylindrical end of the plug so that upon rotation of the stem, the plug can be moved toward and away from the seat. Preferably, and according to an aspect of the invention, seal ring means are carried by the cylindrical portion of the plug for sealingly engaging the walls of the opening. The seal ring means prevents fluid from passing from the valve chamber into the bonnet and seal both the stem-plug connection and the stem threads from the fluid.

An additional aspect of the invention contemplates that the connection between the plug member and the stem will comprise a transverse opening in the cylindrical portion of the plug at a location outwardly of the seal ring. A narrow slot extends from the transverse opening to the outer end of the cylindrical portion of the plug and the end of the stem is shaped so that it can be slid laterally into the transverse opening. For example, the transverse opening is preferably a T-slot and the end of the stem is T-shaped with a somewhat spherical end surface. Also, it is preferred that the stem have a length such that when the bonnet is removed from the body, the stem can be actuated to a position wherein the plug extends completely out of the bonnet opening without exposing the actuating threads. The plug member which contains the seal rings can thus be changed while the stem remains in the bonnet. It is not necessary to remove the handle.

The invention also contemplates that the seal ring means will comprise an assembly of at least three ring members including a resilient O-ring positioned between two polytetrafluoroethylene washers. The inner washer acts as a wiping ring to clean the bore of abrasive particles and prevent wear on the O-ring. The O-ring performs the primary fluid seal function and the outer washer prevents blow-out of the O-ring under operating pressure.

Another and more limited aspect of the invention contemplates that the inner end of the bonnet will sealingly engage the outer end of the seat insert to provide a fluid seal between the bonnet and the body. Additionally, the bonnet is preferably threaded in the body so that during tightening of the bonnet on the body, the seat insert is compressed into the valve chamber.

Accordingly, a primary object of the invention is the provision of a plug-type valve which can be used for high pressure fluids containing substantial amounts of hard particles.

A further object is the provision of a valve of the type described wherein the operating stem and its connection with the valve plug are sealed from the fluids by seals carried on the plug.

Another object of the invention is the provision of a valve of the type described wherein the valve seat insert and plug member containing the seal rings can be changed without exposing the stem threads or removing the handle.

The above and other objects and advantages will become apparent from the following description when read in conjunction with the accompanying drawings wherein:

FIG. 1 is a side elevational view, paritally in cross-section, of a valve embodying the invention;

FIG. 2 is an enlargement of the circled area of FIG. 1;

FIG. 3 is a view taken on line 3—3 of FIG. 1 but showing only the seat insert; and, FIG. 4 is a view showing the valve disassembled and the operating stem moved to a position for plug changing.

Referring more particularly to FIG. 1, the preferred embodiment of the valve is shown as comprising a one-piece body or housing 10 having aligned inlet and outlet flow passages 12 and 14 which connect with a generally conically shaped valve chamber 16. The housing 10 can be formed from many materials but, in the subject embodiment, it is preferably formed from stainless steel. Additionally, although shown as a one-piece body, it could obviously be made in separable section if desired.

The housing is adapted to be connected to flow lines or associated equipment through the use of a male thread end on the passage 14 and female threads 20 formed in a counterbore 22. These connections could also be of many other types, e.g., flanges, swage fittings, etc.

Referring to FIG. 1, it will be seen that the valve chamber 16 extends laterally into the valve body and has a threaded cylindrical outer end portion 24 which receives a bonnet member 25. Positioned within the generally conically shaped portion of the valve chamber 16 is a seat defining insert member 26 having a hollow, truncated conical shape sized so as to be tightly received within the valve chamber. Inlet and outlet ports 28 and 30 are formed through the wall of the seat insert member 26 at locations corresponding to the inlet and outlet flow passages 12 and 14, respectively. This provides a straight through path for maximum flow.

Preferably, the seat insert 26 is formed from a material softer than the valve plug so that if impurities or hard substances become positioned beween the plug and the seat during a closing operation, they will tend to be driven into the replaceable insert and no damage to the plug will take place. Many types of plastics, soft metals or the like can be used for the insert depending upon the operating conditions to which the valve will be subjected.

As can be appreciated, means must be provided to prevent rotation of the seat in the valve chamber while allowing it to be easily removed for replacement. These means can take many forms but, as best shown in FIG. 3, the preferred form comprises a cylindrical protuberance 34 which is received within a corespondingly shaped recess formed in the housing. The protuberance 34 allows the seat insert to be easily removed but prevents it from rotating in the housing. This protuberance is sized so that it will hold the insert in place during reassembly in the field, but it can be removed easily with a small tool. It maintains the seat in proper alignment for straight through flow.

Directing one's attention to FIG. 1, it will be seen that the bonnet member 25 has a threaded inner end 38 which is received in the threaded portion 24 of the valve chamber. The lower inner end 40 of the bonnet member is arranged to engage the top surface of the seat insert to provide a fluid seal. As can be appreciated, the dimensions of the seat insert relative to the depth of the conical portion of the housing 16 are such that when the bonnet 25 is threaded into the body, a compressive loading takes place between end 40 and the upper edge of the seat insert. Additionally, a metal-to-metal surface contact takes place between the bonnet and the housing at surfaces 42 and 44. This provides an additional seal which, in conjunction with the seal between the end face and the upper edge of the insert, prevents fluid from escaping between the housing and the body.

In the embodiment under consideration, the bonnet member 25 has an enlarged center portion 45 provided with wrench flats so that the bonnet may be readily removed and replaced in the housing. Additionally, a lock nut 46 is received on the threaded portion 38 so that the bonnet can be locked to the body and protect against disassembly through accident, vibration, etc. Of course, merely by releasing the lock nut, the bonnet can be readily removed from the body.

Extending through the bonnet is an axial bore 50 which includes a threaded section 52. Immediately below the threaded section 52 and aligned with the valve chamber 16 is a smoothwalled cylindrical section 54. Slidably mounted within cylindrical section 54 is a valve plug member 56. As best shown in FIG. 1, the valve plug member 56 has a truncated, conical end section 58 sized to mate with the internal opening in the valve seat 26. Extending outwardly from the truncated conical section 58 is a cylindrical section 60 which is closely received within the portion 54 of the bonnet bore 50.

Of particular importance to the invention is the arrangement for sealing the bonnet from the operating fluid while permitting free movement of the plug. The means include a seal ring assembly (See FIG. 2 and 4) carried in a circumferential recess 62 formed in the plug. The assembly comprises a resilient O-ring 64 and split washers 65, 66 formed from polytetrafluoroethylene or the like and positioned adjacent the O-ring 64. Ring 64 is, of course, formed from a material capable of withstanding the fluid handled by the valve and performs the primary sealing function. Washer 66 serves as a wiping ring and continually cleans the bonnet bore of abrasive particles which could damage the O-ring 64. Washer 65 also performs a wiping function but primarily acts as a back-up washer to prevent extrusion of O-ring 64 under operating pressure.

In the embodiment shown, the valve plug member 56 is selectively reciprocated through the use of an operating stem 68. Stem 68 is threaded throughout its center section 70 and mates with the threads 52 of bonnet 25.

The stem is releasably connected to the plug 56 by means which permit free rotation of the plug relative to the stem. As shown the reduced diameter end section 72 of stem 68 terminates in a generally T-shaped end 74 which is closely received within outer end 60 of plug 56. As shown in FIGS. 1 and 4, a T-shaped slot is formed into plug 56 and receives the end of the stem. The end face of the stem has a generally speherical configuration as shown at 78.

Preferably, the length of the stem and the cooperating threads 52, 70 are such that the stem can be rotated to a position wherein the upper end 82 of the plug 56 is beneath the end 40 of the bonnet 25. At this location, the plug can then be slid laterally off the stem while the stem threads are still protected by the bonnet and the handle is still in place. This relationship is best shown in FIG. 4.

Carried or formed within the bore 50 of bonnet 25 is an internal shoulder 84 formed at the juncture between threads 52 and the cylindrical bore 54. The shoulder 84 serves to limit outward movement of the plug and stem during opening movement and thereby prevent accidental disassembly under pressure.

Similarly, at the upper end of the bore 50, a recess 88 is formed circumferentially about the stem. A resilient seal washer 92 is received in recess 88. In the subject embodiment, seal washer 92 comprises a cylindrical section of Teflon or the like which closely engages the outer circumference of the upper end of the stem. The primary functions of the seal washer 92 are to prevent dirt, etc., from entering the bonnet and to retain thread lubricant in the bonnet. The seal washer is so designed that it will not form a pressure seal that could trap pressure in this area.

The particular manner in which the stem is operated forms no part of the invention; however, as shown, a transversely extending cylindrical handle 96 is removably affixed to the outer end of the stem by a socket head machine srew 98 which is threadedly received within a bore 100 that intersects the stem receiving bore 102. Additionally, a flat 104 is formed on the stem. Preferably, the socket head machine screw 98 is of a length such that when properly in position, it is within the confines of bore 100. This arrangement allows the handle to have a pleasing appearance and a comfortable feed and prevents releasing of the handle through the use of a wrench by unauthorized persons.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention in so far as they come within the scope of the appended claims.

What is claimed is:

1. A valve comprising:
   a body having a laterally inwardly extending bore which defines a valve chamber, the inner end of said bore being of truncated conical configuration, inlet and outlet flow passages connected with said conical shaped portion;
   a hollow, conically shaped seat insert formed from resilient material positioned in said bore, said insert having ports formed therein to align with the inlet and outlet flow passages;
   a bonnet threaded in the outer end of said bore, said bonnet having a cylindrical bore axially aligned with the bore in said body, the inner end of said bonnet adapted to sealingly engage the outer end of said insert and a shoulder in the bore in said body;
   an actuating stem extending axially into said bonnet bore;
   a plug valve member releasably connected to the end of said stem by connecting means for permitting free rotation of said plug member relative to said stem, said plug member having a first cylindrically shaped portion which is slidably received in said bonnet bore and a conically shaped second portion adapted to sealingly engage said insert, sealing rings carried in said plug member about said first portion between said connecting means and said second portion for sealingly engaging said cylindrical bore in said bonnet and preventing fluid passing through said valve chamber from engaging said connecting means and said actuating stem.

2. The valve as defined in claim 1 wherein said connecting means comprise a transverse T-slot formed in the cylindrical portion of said valve member and a T-head formed in said stem.

3. The valve as defined in claim 2 wherein said sealing rings carried in said plug member are located between said T-slot and said conically shaped second portion.

4. The valve as defined in claim 2 wherein said stem is axially movable in said bonnet bore a distance sufficient such that when said bonnet is removed from said body, said valve member can be moved completely out of said bonnet bore without disassembly of the handle.

5. The valve as defined in claim 1 wherein said bonnet and said stem include cooperating thread portions located axially outwardly of said cylindrical bonnet bore.

6. The valve as defined in claim 1 wherein said sealing rings include an O-ring positioned between a pair of wiping rings.

7. The valve as defined in claim 1 wherein said seat insert member is provided with means to prevent rotation in said valve chamber.

8. The valve as defined in claim 7 wherein said connecting means include a transverse slot formed in said plug member and an enlarged end portion on said stem adapted to slide laterally into said slot.

9. The valve as defined in claim 1 wherein said cylindrical portion of said plug is closely received in said bonnet bore and guided thereby throughout movement of said stem.

* * * * *

UNITED STATES PATENT OFFICE
CERTIFICATE OF CORRECTION

Patent No. 3,761,052   Dated   September 25, 1973

Inventor(s)   William P. Tobbe et al.

It is certified that error appears in the above-identified patent and that said Letters Patent are hereby corrected as shown below:

On the cover sheet [73] "Whitney Research Tool Company" should read -- Whitey Research Tool Co. --. In the Abstract, line 9, "an" should read -- and --. Column 4, line 48, "speherical" should read -- spherical --. Column 5, line 11, "srew" should read -- screw --; line 18, "feed" should read -- feel --.

Signed and sealed this 26th day of February 1974.

(SEAL)
Attest:

EDWARD M. FLETCHER, JR.　　　　　C. MARSHALL DANN
Attesting Officer　　　　　　　　 Commissioner of Patents